Jan. 19, 1932.  A. B. RYPINSKI  1,841,850
METER AND CONNECTION BOX
Filed Feb. 18, 1926   2 Sheets-Sheet 1
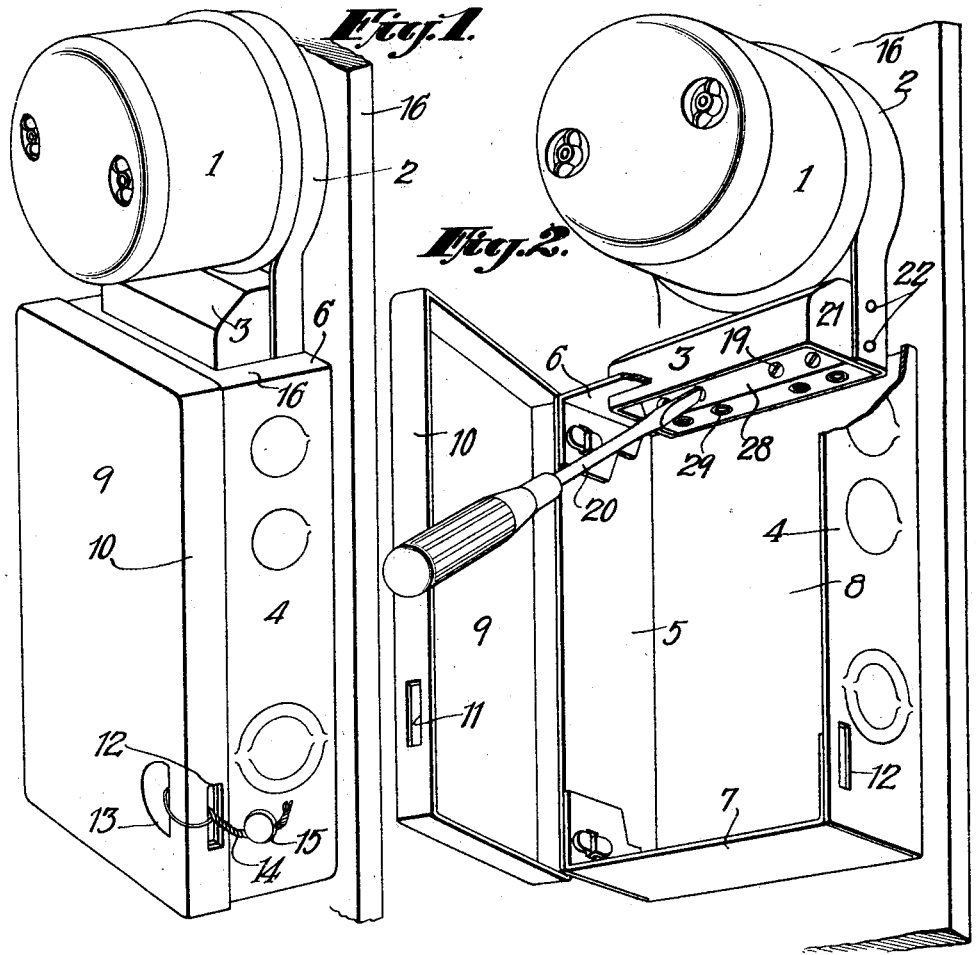
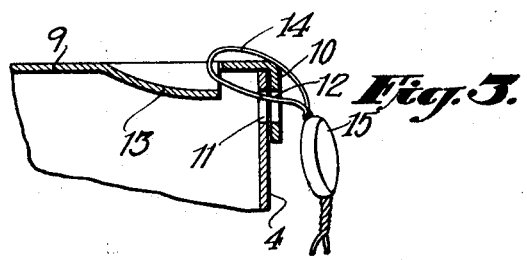
Inventor
ALBERT B. RYPINSKI.
By His Attorney Jan. 19, 1932.  A. B. RYPINSKI  1,841,850
METER AND CONNECTION BOX
Filed Feb. 18, 1926   2 Sheets-Sheet 2
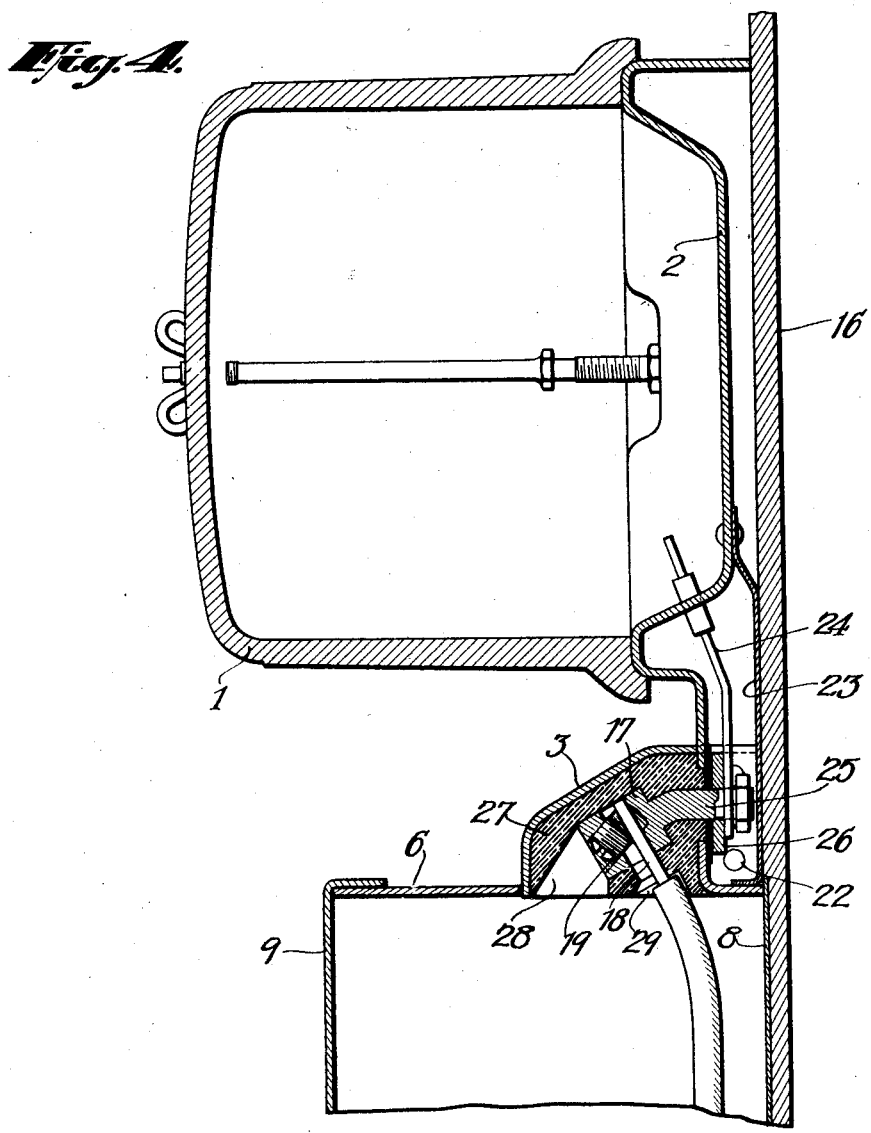
Inventor
ALBERT B. RYPINSKI.
By his Attorney
D. Anthony Usina Patented Jan. 19, 1932

1,841,850

UNITED STATES PATENT OFFICE

ALBERT B. RYPINSKI, OF LAURELTON, LONG ISLAND, NEW YORK, ASSIGNOR, BY MESNE ASSIGNMENTS, TO METROPOLITAN DEVICE CORPORATION, A CORPORATION OF NEW YORK

METER AND CONNECTION BOX

Application filed February 18, 1926. Serial No. 88,978.

The invention aims to provide a simplified arrangement for assembling and connecting electric meters with cut-out or similar mechanisms. The accompanying drawings illustrate an embodiment of the invention.

Fig. 1 is a perspective view of the parts assembled and sealed against tampering;

Fig. 2 is a perspective view showing the box open for access to the meter terminals;

Fig. 3 is a detail of the sealing arrangement in section;

Fig. 4 is a longitudinal section through the terminal chamber of the meter casing and adjacent parts.

Referring to the drawings, the meter casing comprises a cylindrical portion 1 mounted on a base 2 through which the connections pass to a terminal chamber 3 in which are fixed the meter terminals which are to be connected to cut-outs, switches, fuses or other mechanism carried in a box. The box comprises side walls 4 and 5, upper and lower end walls 6 and 7, a back wall 8 and a cover 9 hinged to the wall 5 and provided with flanges 10 which in the closed position overlie the side and end walls.

The wall 4 and the flange 10 are provided with registering slots 11 and 12, Fig. 3, and in line with these is a depressed and slotted portion 13 of the cover so that a wire 14 may be passed around the side wall and cover and fastened by a seal 15 or a lock. The box usually carries switch blades operable by a crank on the outside, and fuses made accessible in various ways. But these particular devices and mechanisms are not illustrated. They may be of various usual or suitable designs, and the same is true of the box itself.

The end wall 6 of the box is provided with an opening in its rear part fitting the terminal chamber 3 of the meter casing, and the latter is mounted with its lower end substantially or approximately flush with the inner face of the end wall. Thus the opening is closed from the outside by the meter casing; and the meter terminals, being inside of the chamber 3, are outside of the box so as to leave practically all the space within the latter unobstructed. The meter casing and box are mounted and fastened in any usual or suitable way on a wall or supporting plate 16.

The meter terminals are provided with sockets 17 open at the lower end of the terminal chamber so that wires 18 from the mechanisms within the box may be readily introduced into the sockets.

Binding screws 19 are provided which can be screwed down on the wires 18 to fasten them in the socket terminals. The heads of these screws are accessible from within the box, being inclined as indicated for easy access by a screw driver 20, Fig. 2, when the box is open.

The chamber 3 for the meter terminals may be made in various ways and of various designs. In the case illustrated the shell thereof has side portions 21 (Fig. 2) which pass down within the side walls of the base 2 of the meter casing and are fastened thereto as by means of rivets 22. Its rear edge bears against a supplementary plate 23 arranged to protect the terminals from the rear. Thus the terminal chamber is a fixed shell which is closed against access except through its lower end, which in turn is enclosed within the box when the meter is in use. Each of the wires 24 from the meter passes down and is held by a nut on a shank 25 of the terminal 17, with an insulating plate 26 interposed between the wire and the overhanging metal parts of the base 2 of the meter casing. For holding the terminals and adjacent parts in the required position, various arrangements may be adopted. I have illustrated a simple, firm and durable provision consisting of insulating composition 27 which is molded about the shanks 25 and terminal blocks 17, with a flared opening 28 extending across the lower face and giving access to all the binding screws 19; and with separate openings 29 making the several terminal blocks 17 accessible for operative connection to the wires 18. A number of separate openings for access to the screws 19 and a common opening for inserting all the wires 18 into operative connection, or common openings for any number of such wires may be adopted with practically the same effect.

The present arrangement avoids the necessity of providing the usual cover for the meter terminal chamber, which had to be removable for the making of the necessary connections and sealable to prevent tampering. With the present arrangement the box has such a cover which is sealable so as to fully protect the meter terminals and binding screws. This arrangement has also the advantage that the end wall of the box may be fixed. In previous arrangements it has generally been necessary to move the end wall of the box in order to get access to the meter terminals. With the present arrangement the end wall may be integral with or permanently attached to some other part of the box, as the side walls in the case illustrated. Or different end walls may be used to adapt the box to meter casings of different shapes, such adapter end walls being fixed or at least not moved in use. These considerations make it possible to manufacture the box as well as the meter casing at a low cost for material and labor and also simplify and lessen the cost of installation.

Various modifications may be made in the shape and arrangement of the several parts without departing from the invention as defined in the following claims.

What I claim is:

1. An electric meter casing having a terminal-carrying portion which is closed at the front and sides and open at the end for attaching wires to the terminals, terminals and securing means therefor enclosed in said casing and accessible through said open end, and a box adapted to carry devices for connection with said terminals and located in position to enclose the open end of the meter casing so as to cut off access to terminals therein except through the box.

2. An electric meter casing having a terminal-carrying portion which is closed at the front and sides and open at the end for attaching wires to the terminals in combination with a box adapted to carry devices for connection with said terminals and having a fixed end wall with an opening registering with that of the meter casing.

3. An electric meter casing having a terminal chamber closed at the front and sides and open at the end, terminals having sockets open also at the end for introduction of wires and fastening devices accessible through such open end for attaching the wires to the terminals.

4. An electric meter casing having a terminal chamber closed at the front and sides and open at the end, terminals in said chamber and binding screws for attaching wires to the terminals, said binding screws extending obliquely upward and backward with their heads exposed for access through the open end of the chamber.

5. An electric meter casing having a closed terminal chamber, terminals and securing means therefor within said chamber, and said terminal chamber having openings in one wall only to receive the end portions of connectors for said terminals and to give access to said securing means.

6. An electric meter casing having integrally closed front and side walls and an open end, a body of insulating material in and substantially filling and closing said casing, terminals in said body of insulating material, and fastening means to secure connectors to said terminals, said insulating material having openings to receive connectors for said terminals and to give access to said fastening means.

7. An electric meter casing having a closed terminal chamber, terminals and securing means therefor within said chamber, said terminal chamber having openings in one wall only to receive the end portions of connectors for said terminals and to give access to said securing means, and a box adapted to carry devices for connection wth said terminals and having a fixed end wall with an opening registering with that of said meter casing.

In witness whereof, I have hereunto signed my name.

ALBERT B. RYPINSKI.